US008917229B2

(12) United States Patent
Park et al.

(10) Patent No.: US 8,917,229 B2
(45) Date of Patent: Dec. 23, 2014

(54) DISPLAY DEVICE AND METHOD OF DRIVING THE SAME

(75) Inventors: Se-Ki Park, Suwon-Si (KR); Gi-Cherl Kim, Yongin-si (KR); Ju-Young Yoon, Seoul (KR); Dong-Min Yeo, Daegu (KR); Eun-Jeong Kang, Cheonan-si (KR); Ho-Sik Shin, Anyang-si (KR)

(73) Assignee: Samsung Display Co., Ltd. (KR)

( * ) Notice: Subject to any disclaimer, the term of this patent is extended or adjusted under 35 U.S.C. 154(b) by 1042 days.

(21) Appl. No.: 12/197,060

(22) Filed: Aug. 22, 2008

(65) Prior Publication Data

US 2009/0184906 A1 Jul. 23, 2009

(30) Foreign Application Priority Data

Jan. 21, 2008 (KR) ........................ 10-2008-0006343

(51) Int. Cl.

| | |
|---|---|
| ***G09G 3/36*** | (2006.01) |
| ***G09G 5/00*** | (2006.01) |
| ***G06F 3/038*** | (2013.01) |
| ***G09G 5/10*** | (2006.01) |
| ***G09G 3/34*** | (2006.01) |

(52) U.S. Cl.

CPC .............. *G09G 3/342* (2013.01); *G09G 3/3611* (2013.01); *G09G 3/3648* (2013.01); *G09G 2320/0633* (2013.01); *G09G 2320/066* (2013.01); *G09G 2310/024* (2013.01); *G09G 2320/0233* (2013.01); *G09G 2320/064* (2013.01); *G09G 2320/0646* (2013.01); *G09G 2360/16* (2013.01)

USPC ............... 345/102; 345/87; 345/89; 345/690; 345/204

(58) Field of Classification Search

USPC ........................ 345/76, 84, 87, 102, 204, 690

See application file for complete search history.

(56) References Cited

U.S. PATENT DOCUMENTS

| | | | | |
|---|---|---|---|---|
| 6,985,131 B2 * | 1/2006 | Kawada et al. | ............... | 345/102 |
| 2005/0184952 A1 * | 8/2005 | Konno et al. | ................. | 345/102 |
| 2006/0109234 A1 * | 5/2006 | Hong et al. | .................. | 345/102 |
| 2006/0238487 A1 * | 10/2006 | Shih | ............................. | 345/102 |

FOREIGN PATENT DOCUMENTS

| | | |
|---|---|---|
| CN | 1838220 | 9/2006 |
| CN | 1932615 | 3/2007 |
| JP | 2007-322880 | 12/2007 |

* cited by examiner

*Primary Examiner* — Kathy Wang-Hurst
*Assistant Examiner* — David Tung
(74) *Attorney, Agent, or Firm* — Innovation Counsel LLP

(57) ABSTRACT

A display device and a method of driving the same are provided according to one or more embodiments. According to an embodiment, the display device includes a display panel including a plurality of display blocks arranged in the form of a matrix; a plurality of lighting blocks emitting light to the display panel, each of the lighting blocks arranged so as to correspond to at least one row of the matrix and having adjustable light luminance; and a signal control unit adapted to receive an image signal, determine display block luminance of the respective display blocks when an image is displayed on the respective display blocks in accordance with the image signal, determine the light luminance of the respective lighting blocks by using the display block luminance of some display blocks corresponding to the respective lighting blocks, correct the image signal by using the light luminance and the display block luminance, and provide the corrected image signal to the display panel.

21 Claims, 19 Drawing Sheets

| | | | | | | | | | | | |
|---|---|---|---|---|---|---|---|---|---|---|---|
| ROW1 | 280 | 280 | 280 | 280 | 280 | 280 | 280 | 280 | 289 | 280 | → 280 |
| ROW2 | 280 | 280 | 200 | 280 | 200 | 280 | 280 | 280 | 280 | 280 | → 280 |
| ROW3 | 280 | 280 | 260 | 280 | 280 | 260 | 200 | 200 | 200 | 200 | → 280 |
| ROW4 | 290 | 290 | 290 | 290 | 290 | 290 | 290 | 230 | 230 | 230 | → 290 |
| ROW5 | 300 | 300 | 300 | 200 | 120 | 200 | 300 | 300 | 300 | 280 | → 300 |
| ROW6 | 280 | 280 | 280 | 260 | 200 | 260 | 300 | 290 | 200 | 200 | → 300 |
| ROW7 | 150 | 170 | 170 | 80 | 80 | 80 | 200 | 200 | | | → 200 |
| ROW8 | 10 | 10 | 10 | 10 | 10 | 10 | 10 | 10 | 10 | 10 | → 10 |

| | | | | | | | | | | |
|---|---|---|---|---|---|---|---|---|---|---|
| ROW1 | 1.00 | 1.00 | 1.00 | 1.00 | 1.00 | 1.00 | 1.00 | 1.00 | 1.00 | 1.00 |
| ROW2 | 1.00 | 1.00 | 0.71 | 1.00 | 0.71 | 1.00 | 1.00 | 1.00 | 1.00 | 1.00 |
| ROW3 | 1.00 | 1.00 | 0.93 | 1.00 | 1.00 | 0.93 | 0.71 | 0.71 | 0.71 | 0.71 |
| ROW4 | 1.00 | 1.00 | 1.00 | 1.00 | 1.00 | 1.00 | 1.00 | 0.79 | 0.79 | 0.79 |
| ROW5 | 1.00 | 1.00 | 1.00 | 0.67 | 0.40 | 0.67 | 1.00 | 1.00 | 1.00 | 0.93 |
| ROW6 | 0.93 | 0.93 | 0.93 | 0.87 | 0.67 | 0.87 | 1.00 | 0.97 | 0.67 | 0.67 |
| ROW7 | 0.75 | 0.85 | 0.85 | 0.4 | 0.4 | 0.4 | 1.00 | 1.00 | 0.25 | 0.25 |
| ROW8 | 1.00 | 1.00 | 1.00 | 1.00 | 1.00 | 1.00 | 1.00 | 1.00 | 1.00 | 1.00 |

FIG.15B

| | | | |
|---|---|---|---|
| I | $B1 = b1 + C_{12}b2$<br>$B2 = C_{21}b1 + b2 + C_{23}b3$<br>$B3 = C_{32}b2 + b3$ | → | b1, b2, b3 |
| II | $B2 = b2 + C_{23}b3$<br>$B3 = C_{32}b2 + b3 + C_{43}b4$<br>$B4 = C_{43}b3 + b4$ | → | b2, b3, b4 |
| III | $B3 = b3 + C_{34}b4$<br>$B4 = C_{43}b3 + b4 + C_{45}b5$<br>$B5 = C_{54}b4 + b5$ | → | b3, b4, b5 |
| IV | $B4 = b4 + C_{45}b5$<br>$B5 = C_{54}b4 + b5 + C_{56}b6$<br>$B6 = C_{65}b5 + b6$ | → | b4, b5, b6 |

$$B1 = b1 + C_{12}b2 + C_{13}b3 + C_{14}b4 + C_{15}b5 + C_{16}b6$$

$$B2 = C_{21}b1 + b2 + C_{23}b3 + C_{24}b4 + C_{25}b5 + C_{26}b6$$

$$B3 = C_{31}b1 + C_{32}b2 + b3 + C_{34}b4 + C_{35}b5 + C_{36}b6$$

$$B4 = C_{41}b1 + C_{42}b2 + C_{43}b3 + b4 + C_{45}b5 + C_{46}b6$$

$$B5 = C_{51}b1 + C_{52}b2 + C_{53}b3 + C_{54}b4 + b5 + C_{56}b6$$

$$B6 = C_{61}b1 + C_{62}b2 + C_{63}b3 + C_{64}b4 + C_{65}b5 + b6$$

FIG.20

| COL1 | COL2 | COL3 | COL4 | COL5 | COL6 | COL7 | COL8 | COL9 | COL10 |
|---|---|---|---|---|---|---|---|---|---|
| 1.00 | 1.00 | 1.00 | 1.00 | 1.00 | 1.00 | 1.00 | 1.00 | 1.00 | 1.00 |
| 1.00 | 1.00 | 0.71 | 1.00 | 0.71 | 1.00 | 1.00 | 1.00 | 1.00 | 1.00 |
| 1.00 | 1.00 | 0.93 | 1.00 | 1.00 | 0.93 | 0.71 | 0.71 | 0.71 | 0.71 |
| 1.00 | 1.00 | 1.00 | 1.00 | 1.00 | 1.00 | 1.00 | 0.79 | 0.79 | 0.79 |
| 1.00 | 1.00 | 1.00 | 0.67 | 0.40 | 0.67 | 1.00 | 1.00 | 1.00 | 0.93 |
| 0.93 | 0.93 | 0.93 | 0.87 | 0.67 | 0.87 | 1.00 | 0.97 | 0.67 | 0.67 |
| 0.75 | 0.85 | 0.85 | 0.4 | 0.4 | 0.4 | 1.00 | 1.00 | 0.25 | 0.25 |
| 1.00 | 1.00 | 1.00 | 1.00 | 1.00 | 1.00 | 1.00 | 1.00 | 1.00 | 1.00 |
| 0.96 | 0.97 | 0.95 | 0.84 | 0.77 | 0.85 | 0.96 | 0.82 | 0.80 | 0.79 |

DISPLAY DEVICE AND METHOD OF DRIVING THE SAME

CROSS-REFERENCE TO RELATED APPLICATION

This application is based on and claims priority to and benefit from Korean Patent Application No. 10-2008-0006343, filed on Jan. 21, 2008 in the Korean Intellectual Property Office, the disclosure of which is incorporated herein by reference in its entirety.

BACKGROUND

1. Technical Field

Embodiments of the present invention relate to a display device and a method of driving the same.

2. Description of the Prior Art

A liquid crystal display (LCD), which is a type of flat panel display, is provided with a liquid crystal display (LCD) panel including a first substrate having a pixel electrode, a second substrate having a common electrode, and a liquid crystal layer having dielectric anisotropy and injected between the first substrate and the second substrate. An electric field is formed between the pixel electrode and the common electrode, and through adjustment of the intensity of the electric field, the quantity of light transmitting through the LCD panel is controlled to display a desired image on the LCD panel. Since the LCD is not a self-illumination display device, it includes a plurality of lighting blocks-.

Recently, in order to improve the display quality, techniques have been developed that divide an LCD panel into a plurality of display blocks, arrange a plurality of lighting blocks corresponding to the respective display blocks, and control luminance of the respective lighting blocks in accordance with an image being displayed on the respective display blocks.

If the number of display blocks provided in the LCD is large, then the number of lighting blocks provided corresponding to the display blocks also becomes large. Accordingly, the number of light sources and the number of drivers for driving the light sources are increased, and thus the manufacturing cost of the LCD is increased.

SUMMARY

Accordingly, one or more embodiments of the present invention provide a display device that may reduce the manufacturing cost thereof. Embodiments of the present invention also provide a method of driving a display device that may reduce the manufacturing cost of the device thereof.

Additional advantages, objects, and features of the invention according to one or more embodiments will be set forth in part in the description which follows and in part will become apparent to those having ordinary skill in the art upon examination of the following or may be learned from practice of the invention.

There is provided a display device, according to embodiments of the present invention, which includes a display panel including a plurality of display blocks arranged in the form of a matrix; a plurality of lighting blocks emitting light to the display panel, each of the lighting blocks arranged so as to correspond to at least one row of the matrix and having adjustable light luminance; and a signal control unit adapted to receive an image signal, determine display block luminance of the respective display blocks when an image is displayed on the respective display blocks in accordance with the image signal, determine the light luminance of the respective lighting blocks by using the display block luminance of some display blocks corresponding to the respective lighting blocks, correct the image signal by using the light luminance and the display block luminance, and provide the corrected image signal to the display panel.

In another aspect according to an embodiment of the present invention, there is provided a display device, which includes a display panel including a plurality of display blocks arranged in the form of a matrix; a plurality of lighting blocks including light sources provided on at least one of one side and the other side of a lower part of the display panel, each of the lighting blocks being arranged so as to correspond to at least one row of the matrix and having adjustable light luminance; and a signal control unit adapted to receive an image signal, determine display block luminance of the respective display blocks when an image is displayed on the respective display blocks in accordance with the image signal, determine the light luminance of the respective lighting blocks by using the display block luminance of some display blocks corresponding to the respective lighting blocks, correct the image signal by using the light luminance and the display block luminance, and provide the corrected image signal to the display panel.

In still another aspect according to another embodiment of the present invention, there is provided a method of driving a display device including a display panel having a plurality of display blocks arranged in the form of a matrix, and a plurality of lighting blocks each being arranged so as to correspond to at least one row of the matrix and emitting light to the display panel, which includes receiving an image signal and determining display block luminance of the respective display blocks; determining light luminance of the respective lighting blocks by using the display block luminance of some display blocks corresponding to the respective lighting blocks; correcting the image signal in accordance with the light luminance and the display block luminance; emitting light in accordance with the corrected image signal; and displaying an image in accordance with the corrected image signal.

BRIEF DESCRIPTION OF THE DRAWINGS

The above and other objects, features and advantages of the present invention according to one or more embodiments will be more apparent from the following detailed description taken in conjunction with the accompanying drawings, in which:

FIG. 15B is a view showing equations, explaining the operation of an inherent light luminance calculation unit of FIG. 14 according to an embodiment of the present invention;

FIG. 20 is a table explaining the operation of the signal control unit of FIG. 19 according to an embodiment of the present invention.

DETAILED DESCRIPTION

Figure 1:
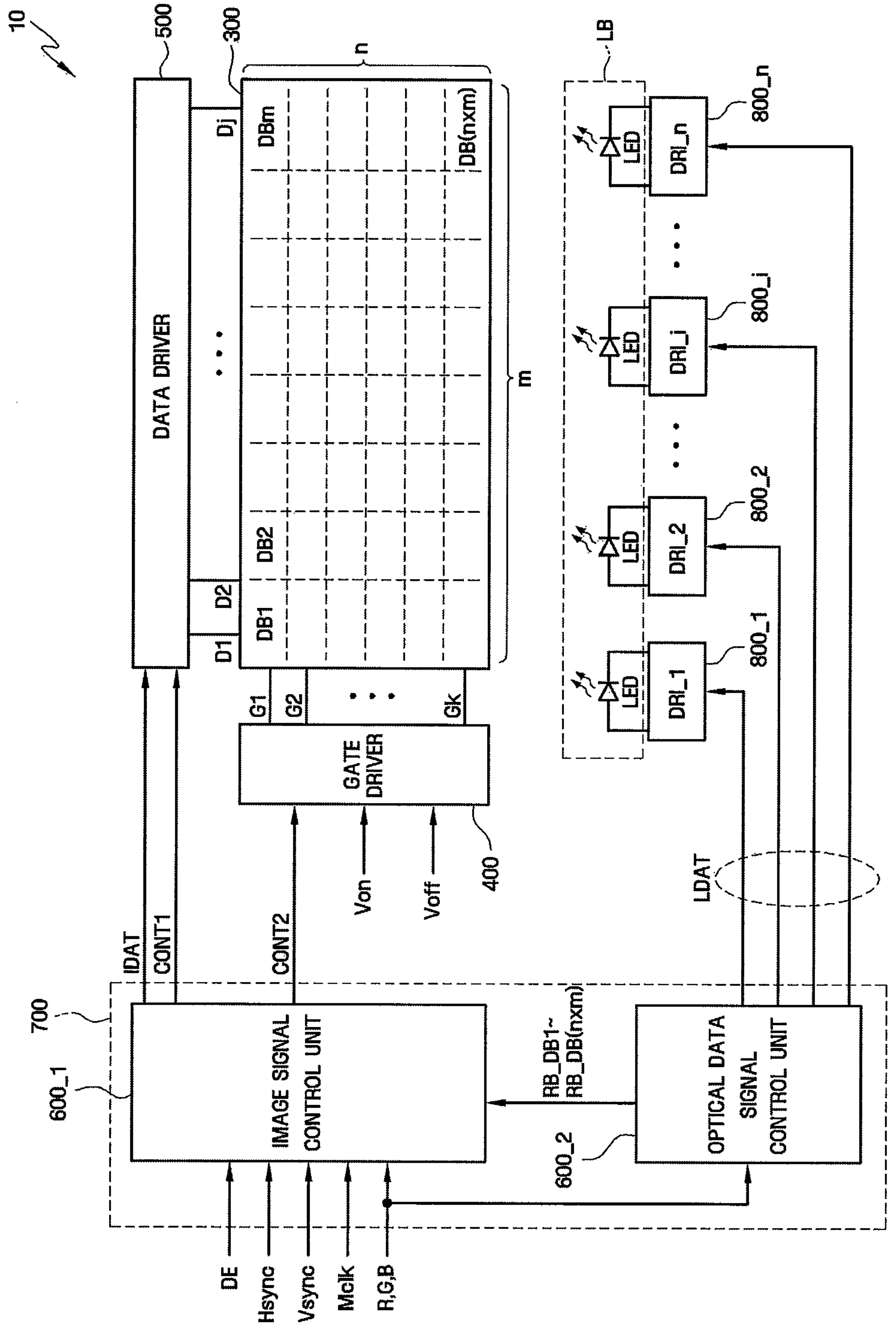
FIG. 1 is a block diagram illustrating the configuration of a liquid crystal display, explaining a liquid crystal display and a method of driving the same according to an embodiment of the present invention.

Hereinafter, one or more embodiments of the present invention will be described in detail with reference to the accompanying drawings. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In general, the same drawing reference numerals are used for the same elements across various figures.

The term “connected to” or “coupled to” that is used to designate a connection or coupling of one element to another element includes both a case that an element is “directly connected or coupled to” another element and a case that an element is connected or coupled to another element via still another element. In this case, the term “directly connected to” or “directly coupled to” means that an element is connected or coupled to another element without intervention of any other element. Also, the term “and/or” includes the respective described items and combinations thereof.

Although the terms “first, second, and so forth” are used to describe diverse elements, components and/or sections, such elements, components and/or sections are not limited by the terms. The terms are used only to discriminate an element, component, or section from other elements, components, or sections. Accordingly, in the following description, a first element, first component, or first section may be a second element, second component, or second section.

In the following description of embodiments of the present invention, the terms used are for explaining embodiments of the present invention, but do not limit the scope of the present invention. In the description, a singular expression may include a plural expression unless specially described. The term “comprises” and/or “comprising” used in the description means that one or more other components, steps, operation and/or existence or addition of elements are not excluded in addition to the described components, steps, operation and/or elements.

Unless specially defined, all terms (including technical and scientific terms) used in the description could be used as meanings commonly understood by those ordinary skilled in the art to which the present invention belongs. In addition, terms that are generally used but are not defined in the dictionary are not interpreted ideally or excessively unless they have been clearly and specially defined.

Hereinafter, embodiments of the present invention will be explained with reference to a liquid crystal display as an example of a display device, but is not limited thereto. Also, in the following description, the terms “row” and “column” of a matrix may be “column” and “row”, respectively, in accordance with the view point of an observer. Accordingly, in the description of the embodiments of the present invention, the term “row” may be replaced by “column” and the term “column” may be replaced by “row”.

Figure 2:
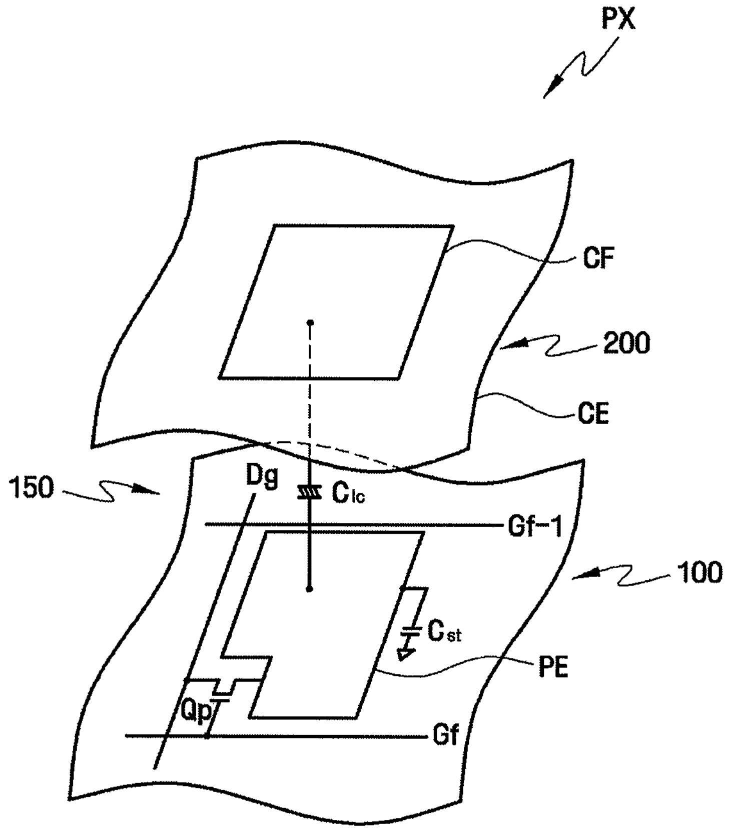
FIG. 2 is an equivalent circuit diagram of one pixel according to an embodiment of the present invention.
Figure 3:
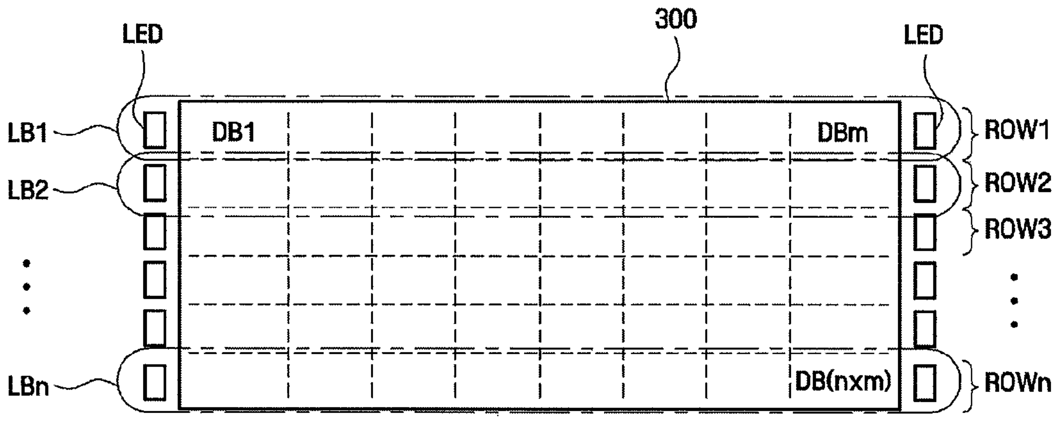
FIG. 3 is a schematic view explaining an arrangement form of display blocks and lighting blocks LB1 to LBn of FIG. 1 according to an embodiment of the present invention.

Referring to FIGS. 1 to 3, a liquid crystal display and a method of driving the same according to an embodiment of the present invention will be described. FIG. 1 is a block diagram illustrating the configuration of a liquid crystal display, explaining a liquid crystal display and a method of driving the same according to an embodiment of the present invention. FIG. 2 is an equivalent circuit diagram of one pixel according to an embodiment of the present invention, and FIG. 3 is a schematic view explaining an arrangement form of display blocks and lighting blocks LB1 to LBn of FIG. 1 according to an embodiment of the present invention.

Referring to FIG. 1, the liquid crystal display (LCD) device 10 includes a liquid crystal display (LCD) panel 300, a gate driver 400, a data driver 500, a signal control unit 700, first to n-th backlight drivers 800_1 to 800_*n*. Here, the signal control unit 700 is functionally divided into an image signal control unit 600_1 and an optical data signal control unit 600_2. The image signal control unit 600_1 controls an image displayed on the LCD panel 300, and the optical data signal control unit 600_2 controls the first to n-th backlight drivers 800_1 to 800_*n*. The image signal control unit 600_1 and the optical data signal control unit 600_2 may be physically separated from each other.

The LCD panel 300 is divided into a plurality of display blocks DB1 to DB(n×m). For example, the plurality of display blocks DB1 to DB(n×m) is arranged in the form of a (n×m) matrix. The respective display blocks DB1 to DB(n× m) include a plurality of pixels. The LCD panel 300 includes a plurality of gate lines G1 to Gk and a plurality of data lines D1 to Dj.

An equivalent circuit of one pixel is illustrated in FIG. 2. A pixel PX, for example, a pixel PX connected to the f-th (where, f=1~k) gate line Gf and the g-th (where, g=1~j) data line Dg, includes a switching element Qp connected to the gate line Gf and the data line Dg, a liquid crystal capacitor Clc and a storage capacitor Cst connected to the switching element. The liquid crystal capacitor Clc includes a pixel electrode PE of the first substrate 100 and a common electrode CE of the second substrate 200. On a part of a common electrode CE, a color filter CF is formed.

The gate driver 400 (shown in FIG. 1) receives a gate control signal CONT2 from the signal control unit 700, and applies a gate signal to the gate lines G1 to Gk. Here, the gate signal is composed of a combination of a gate-on voltage Von and a gate-off voltage Voff provided from a gate on/off voltage generation unit (not illustrated). The gate control signal CONT2 is a signal for controlling the operation of the gate driver 400, and includes a vertical start signal for starting the operation of the gate driver 400, a gate clock signal for determining an output time of the gate-on voltage, and an output enable signal for determining a pulse width of the gate-on voltage.

The data driver 500 receives a data control signal CONT1 from the signal control unit 700, and applies a voltage corresponding to an image data signal IDAT to the data lines D1 to Dj. The data control signal CONT1 includes a signal for controlling the operation of the data driver 500. The signal for controlling the operation of the data driver 500 includes a horizontal start signal for starting the operation of the data driver 500, and an output command signal for commanding the output of the image data voltage.

A plurality of lighting blocks LB1 to LBn are provided on a lower part of the LCD panel 300, and provide light to the LCD panel 300. The plurality of lighting blocks LB1 to LBn, for example, may be arranged as illustrated in FIG. 3. That is, the plurality of lighting blocks LB1 to LBn may be separately arranged so as to correspond to at least one of rows ROW1 to ROWn of the display blocks DB1 To DB(n×m) arranged in the form of a matrix. In FIG. 3, it is exemplified that the lighting blocks LB1 to LBn may be arranged so as to correspond to the rows ROW1 to ROWn in a one-to-one manner. That is, the plurality of display blocks DB1 to DB(n×m) are composed of n rows and m columns, and the lighting blocks LB1 to LBn are composed of n rows ROW1 to ROWn. The lighting blocks LB1 to LBn are of an edge type, and include light sources provided on one side and on the other side of a lower part of the LCD panel 300. Here, the light source may be an LED.

The respective backlight drivers 800_1 to 800_*n*, for example, are connected to lighting blocks LB1 to LBn, respectively, and adjust the luminance of the respective lighting blocks LB1 to LBn. For example, since the number of lighting blocks LB1 to LBn is “n,” the number of backlight drivers 800_1 to 800_*n* is also “n.” That is, the lighting blocks LB1 to LBn may be arranged to correspond to the rows of the matrix, and thus the light luminance for the lighting blocks LB1 to LBn may be adjusted.

The plurality of lighting blocks LB1 to LBn adjust the light luminance in response to optical data signals LDAT, and the respective display blocks DB1 to DB(n×m) display an image in response to an image data signal IDAT. Here, the optical data signal LDAT is a signal generated by the signal control unit 700 based on RGB image signals R, G, and B, and the image data signal IDAT is a corrected signal outputted by the signal control unit 700 that corresponds to RGB image signals R, G, and B in the unit of display blocks DB1 to DB(n×m) in accordance with the light luminance. According to the LCD 10 as described above, even though the respective lighting blocks LB1 to LBn adjust the light luminance corresponding to the rows ROW1 to ROWn of the matrix, the signal control unit 700 corrects the RGB image signals R, G, and B in the unit of display blocks DB1 to DB(n×m) in accordance with the light luminance, and thus, substantially the same effect may be obtained as that obtained by the light luminance adjustment through the lighting blocks LB1 to LBn arranged in the form of a matrix corresponding to the respective display blocks DB1 to DB(n×m).

Figure 4:
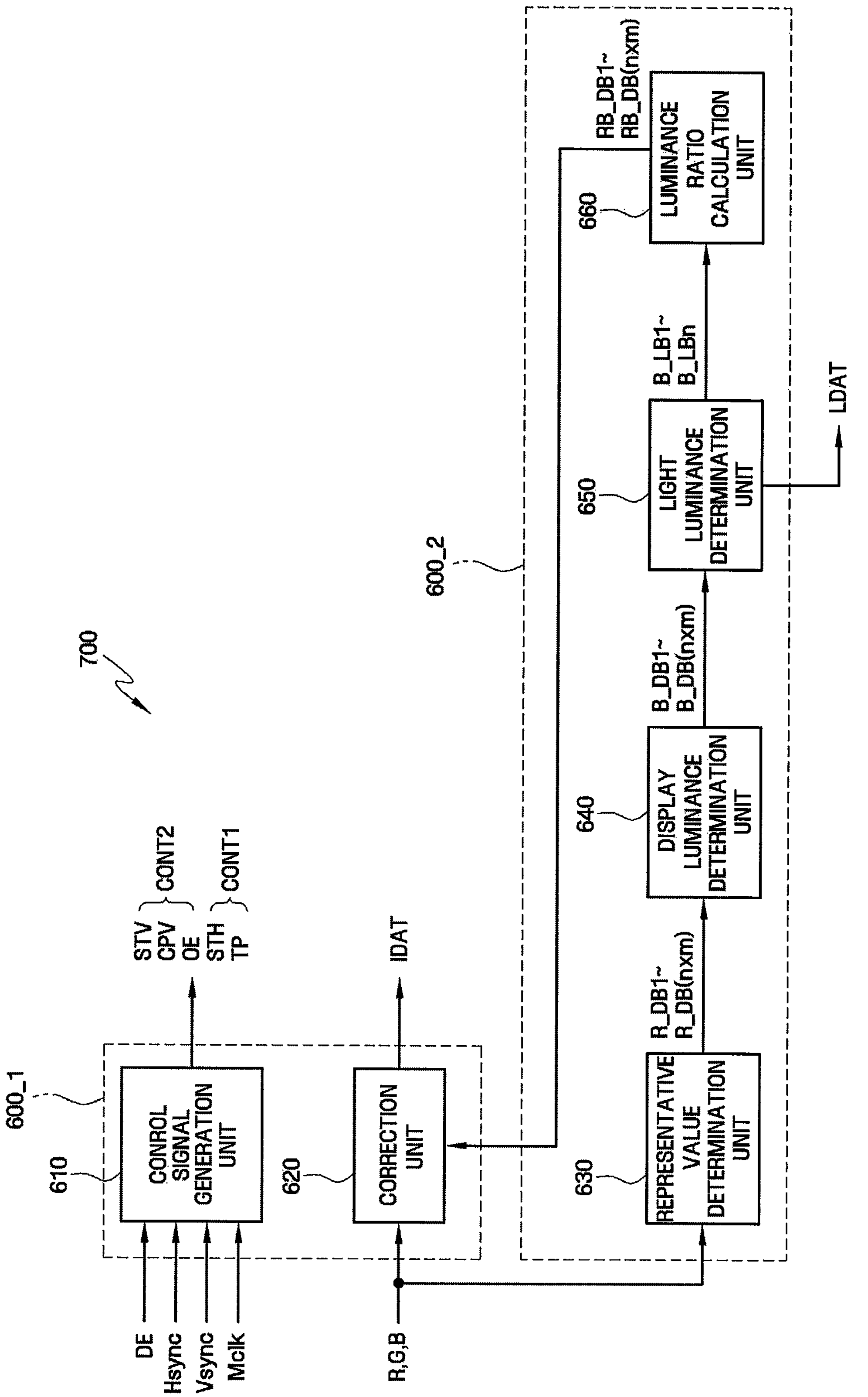
FIG. 4 is a block diagram explaining a signal control unit of FIG. 1 according to an embodiment of the present invention.
Figures 7, 8:
FIG. 8 is a table explaining the operation of the signal control unit of FIG. 4 according to an embodiment of the present invention.
Figure 9:
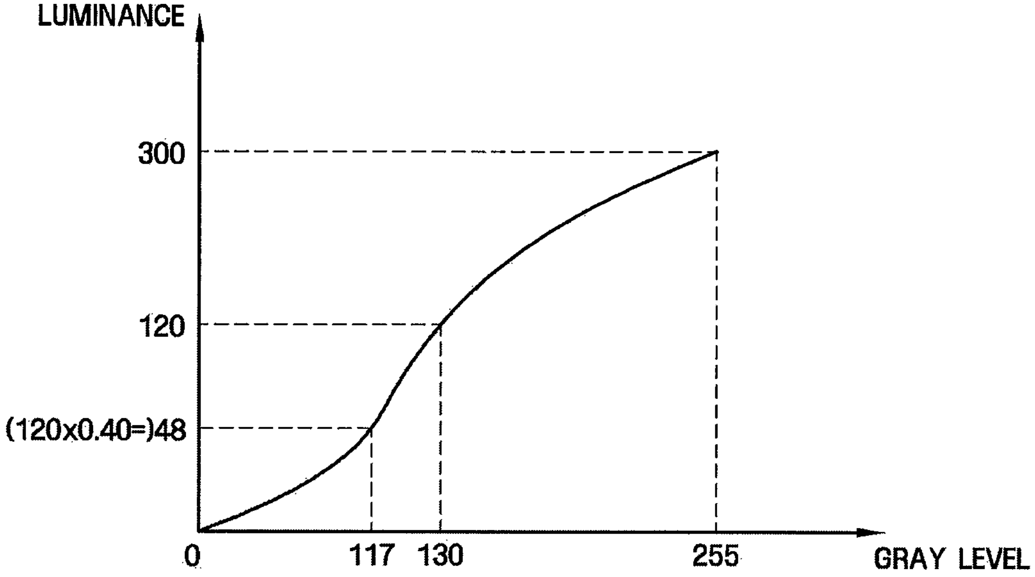
FIG. 9 is a graph explaining the operation of the signal control unit according to an embodiment of the present invention.

The operation of the signal control unit will be described in more detail with reference to FIGS. 4 to 9. FIG. 4 is a block diagram explaining the signal control unit of FIG. 1, and FIGS. 5 to 7 are conceptual views explaining the operation of the signal control unit of FIG. 4 according to embodiments of the present invention. FIG. 8 is a table explaining the operation of the signal control unit of FIG. 4, and FIG. 9 is a graph explaining the operation of the signal control unit according to an embodiment of the present invention.

The signal control unit 700 includes an image signal control unit 600_1 and an optical data signal control unit 600_2. The image signal control unit 600_1 includes a control signal generation unit 610 and a correction unit 620. The optical data signal control unit 600_2 includes a representative value determination unit 630, a display luminance determination unit 640, a light luminance determination unit 650, and a luminance ratio calculation unit 660. The optical data signal control unit 600_2 adjusts the light luminance values B_LB1 to B_LBn of the respective lighting blocks LB1 to LBn by outputting the optical data signal LDAT based on the RGB image signals R, G, and B. The image signal control unit 600_1 corrects the RGB image signals R, G, and B by using the light luminance values LB1 to LBn and the display block luminance values B_DB1 to B_DB(n×m). However, according to one or more embodiments, at least one of the inner blocks of the optical data signal control unit 600_2 may be included inside the image signal control unit 600_1.

First, a process in which the optical data signal control unit 600_2 adjusts the light luminance of the lighting blocks LB1 to LBn, which are arranged to correspond to rows ROW1 to ROWn, will be described in detail according to an embodiment.

Figures 5, 6:
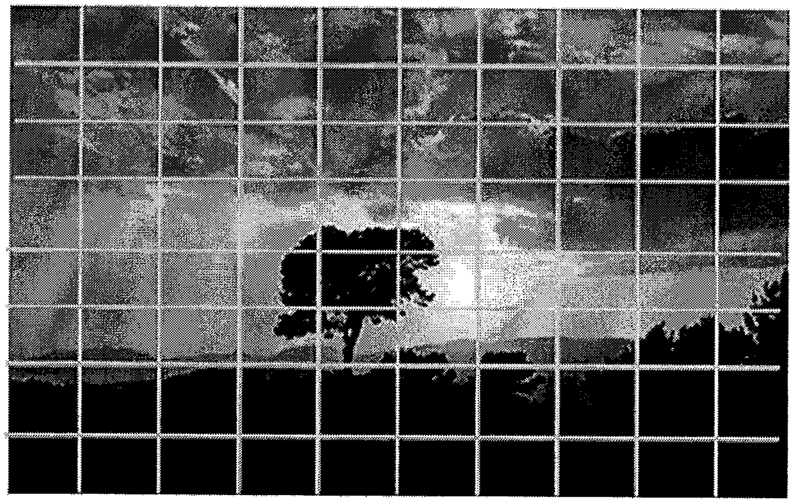
FIGS. 5 to 7 are conceptual views explaining the operation of the signal control unit of FIG. 4 according to one or more embodiments of the present invention.

The representative value determination unit 630 receives the RGB image signals R, G, and B, and determines representative values R_DB1 to R_DB(n×m) of the respective display blocks DB1 to DB(n×m). For example, when the RGB image signals R, G, and B are provided to the respective display blocks DB1 to DB(n×m) and an image is displayed as shown in FIG. 5, the representative value determination unit 630 determines the representative values R_DB1 to R_DB(n×m) of the RGB image signals R, G, and B provided to the respective display blocks DB1 to DB(n×m). For example, the representative values R_DB1 to R_DB(n×m) of the respective display blocks may be average values of the RGB image signals R, G, and B provided to the respective display blocks DB1 to DB(n×m).

The display luminance determination unit 640 determines the display block luminance values B_DB1 to B_DB(n×m) of the respective display blocks DB1 to DB(n×m) by using the representative values R_DB1 to R_DB(n×m) of the respective display blocks DB1 to DB(n×m). For example, when the RGB image signals R, G, and B are provided to the respective display blocks DB1 to DB(n×m) and an image is displayed as shown in FIG. 5, the display luminance determination unit 640 determines the display block luminance values B_DB1 to B_DB(n×m) of the respective display blocks DB1 to DB(n×m) as shown in FIG. 6. For example, the display block luminance values B_DB1 to B_DB(n×m) of the respective display blocks DB1 to DB(n×m) may be any one of values in the range of 10 nit to 300 nit corresponding to the image as shown in FIG. 5. Here, the display luminance determination unit 640 determines the display block luminance values B_DB1 to B_DB(n×m) of the respective display blocks DB1 to DB(n×m) corresponding to the representative values R_DB1 to R_DB(n×m) of the respective display blocks DB1 to DB(n×m) by using a lookup table (not illustrated).

The light luminance determination unit 650 determines the light luminance values B_LB1 to B_LBn of the respective lighting blocks LB1 to LBn by using the display block luminance values B_DB1 to B_DB(n×m) of the respective display blocks DB1 to DB(n×m). As described above, since the respective lighting blocks LB1 to LBn correspond to rows ROW1 to ROWn of the respective display blocks DB1 to DB(n×m), the light luminance determination unit 650 determines the maximum values among the display block luminance values B_DB1 to B_DB(n×m) of some of the display blocks DB1 to DB(n×m) corresponding to the respective lighting blocks LB1 to LBn to be the light luminance values B_LB1 to B_LBn of the respective lighting blocks LB1 to LBn.

More specifically, as shown in the embodiment of FIG. 6, when the display blocks DB1 to DB(n×m) are arranged in the form of an 8×10 matrix, 10 display blocks of the first row ROW1 have the display block luminance of 280 nit, respectively. Accordingly, the light luminance determination unit 650 determines the light luminance of the lighting blocks corresponding to the first row ROW1 as 280 nit. The 10 display blocks of the fifth row ROW5 may have the display block luminance of any one of the display block luminance amounts including 120 nit and 300 nit. Accordingly, the light luminance determination unit 650 determines the light luminance of the lighting blocks corresponding to the fifth row ROW5 as 300 nit.

As a result, the light luminance determination unit 650, as shown in the embodiment of FIG. 7, determines the maximum values among the display block luminance values B_DB1 to B_DB(n×m) of some of the display blocks DB1 to DB(n×m) corresponding to the respective lighting blocks LB1 to LBn to be the light luminance values B_LB1 to B_LBn.

In addition, the light luminance determination unit 650 outputs the optical data signals LDAT corresponding to the light luminance values B_LB1 to B_LBn to the backlight drivers 800_1 to 800_*n*. The respective lighting blocks LB1 to LBn receive the optical data signals LDAT and emit light with the light luminance values B_LB1 to B_LBn, respectively, as shown in FIG. 7. Here, the optical data signal LDAT may be a PWM (Pulse Width Modulation) signal. Also, the light luminance determination unit 650 outputs the light luminance signals B_LB1 to B_LBn of the respective lighting blocks LB1 to LBn to the luminance ratio calculation unit 660.

Next, a process of correcting the RGB image signals R, G, and B in the unit of display blocks DB1 to DB(n×m) by using the light luminance values B_LB1 to B_LBn of the respective lighting blocks LB1 to LBn and the display block luminance values B_DB1 to B_DB(n×m) of the respective display blocks DB1 to DB(n×m) will be described in detail according to one or more embodiments.

The luminance ratio calculation unit 660 calculates the block luminance ratios RB_DB1 to RB_DB(n×m), which are the ratios of the display block luminance values B_DB1 to B_DB(n×m) to the light luminance values B_LB1 to B_LBn, respectively. Referring to FIGS. 5 and 8, since the light luminance of the lighting block corresponding to the first row ROW1 is 280 nit and the display block luminance of the respective display blocks of the first row ROW1 is 280 nit, the block luminance ratios RB_DB1 to RB_DB(n×m) of the respective display blocks of the first row ROW1 become 1.00. Also, since the light luminance of the lighting block corresponding to the fifth row ROW5 is 300 nit and the display block luminance of the respective display blocks of the fifth row ROW5 may be, for example, either 120 nit or 300 nit, the block luminance ratios of the respective display blocks of the fifth row ROW5 are either 0.40 or 1.00. As described above, the luminance ratio calculation unit 660 calculates the block luminance ratios RB_DB1 to RB_D(n×m) of the respective display block luminance values B_DB1 to B_DB(n×m) to the respective light luminance values B_LB1 to B_LBn, and outputs the calculated block luminance ratios RB_DB1 to RB_D(n×m) to the correction unit 620.

The correction unit 620 receives the RGB image signal R, G, and B and the block luminance ratios RB_DB1 to RB_D(n×m), corrects the RGB image signals R, G, and B in the unit of display blocks DB1 to DB(n×m), and outputs an image data signal IDAT.

For example, as shown in the embodiment of FIG. 8, since the block luminance ratios of 10 display blocks of the first row ROW1 are 1, the correction unit 620 receives the RGB image signals R, G, and B corresponding to 10 display blocks of the first row ROW1, and outputs the image data signal IDAT as it is without correcting its gray level. On the other hand, since the block luminance ratio of the fifth display block of the fifth row ROW5 is 0.40, the correction unit 620 corrects the gray level of the RGB image signals R, G, and B in accordance with the block luminance ratio of 0.40. This feature will be described in more detail with reference to FIG. 9.

A curve illustrated in FIG. 9 indicates the display block luminance B_DB1 to B_DB(n×m) according to the gray level of the RGB image signals R, G, and B when the block luminance ratio is 1. For example, it is assumed that the display block luminance B_DB1 to B_DB(n×m) has the maximum value of 300 nit when the block luminance ratio is 1, therefore, RGB image signals R, G, and B having a maximum gray level of 255 are provided to the display blocks to display an image. It is also assumed that the display block luminance B_DB1 to B_DB(n×m) is 120 nit when the RGB image signals R, G, and B having a gray level of 130 are provided to the display blocks to display an image.

Since the display block luminance of the fifth display block of the fifth row ROW5 is 120 nit (See FIG. 6), but the light luminance B_LB1 to B_LBn of the lighting blocks LB1 to LBn corresponding to the fifth row ROW5 is 300, the correction unit 620 lowers the gray level of the RGB image signals R, G, and B provided to the fifth display block of the fifth row ROW5. For example, if the gray level of the RGB image signals R, G, and B provided to the fifth display block of the fifth row ROW5 is 130, the correction unit corrects the RGB image signals to output the image data signal IDAT having the gray level of 117 corresponding to 48 nit (=120×0.40). Since the display block luminance of the fifth display block of the fifth row ROW5 is 120 nit, but the light luminance of the lighting blocks corresponding to the fifth row ROW5 is 300 nit, the correction unit 620 corrects the gray level of the RGB image signals in accordance with the block luminance ratio of 0.40. In this case, an effect may be obtained that is substantially the same as or similar to that of a case in which the light of 120 nit is provided from a lower part of the fifth display block of the fifth row ROW5.

In other words, the respective lighting blocks LB1 to LBn may be arranged to correspond to rows ROW1 to ROW8 of the matrix, and the light luminance B_LB1 to B_LBn may be adjusted for each of the lighting blocks LB1 to LBn. However, by correcting the gray level of the RGB image signals R, G, and B in the unit of display blocks DB1 to DB(n×m) corresponding to the light luminance B_LB1 to B_LBn, the lighting blocks LB1 to LBn are arranged to correspond to the respective display blocks DB1 to DB(n×m) in the form of a matrix as illustrated in FIG. 6, and thus, an effect may be obtained that is substantially the same as or similar to that of a case in which the light luminance B_LB1 to B_LBn is adjusted. Here, the respective lighting blocks LB1 to LBn may be of an edge type as described above. That is, even if using a small number of LEDs and backlight drivers 800_1 to 800_*n*, the display quality can be improved with the manufacturing cost of the LCD 10 being reduced.

However, the method of correcting the RGB image signals R, G, and B is not limited thereto. For example, the correction unit 620 may correct the RGB image signals R, G, and B having the gray level of 130 to output the image data signal IDAT having a gray level of 52 (=130×0.40).

The control signal generation unit 610 of FIG. 4 receives external control signals Vsync, Hsync, Mclk, and DE, and outputs the data control signal CONT1 and the gate control signal CONT2. For example, the control signal generation unit 610 may output a vertical start signal STV for starting the operation of the gate driver 400 of FIG. 1, a gate clock signal CPV for determining an output time of a gate-on voltage, an output enable signal OE for determining a pulse width of a gate-on voltage, a horizontal start signal STH for starting the operation of the data driver 400 of FIG. 1, and an output command signal for commanding an output of an image data voltage.

Figure 10:
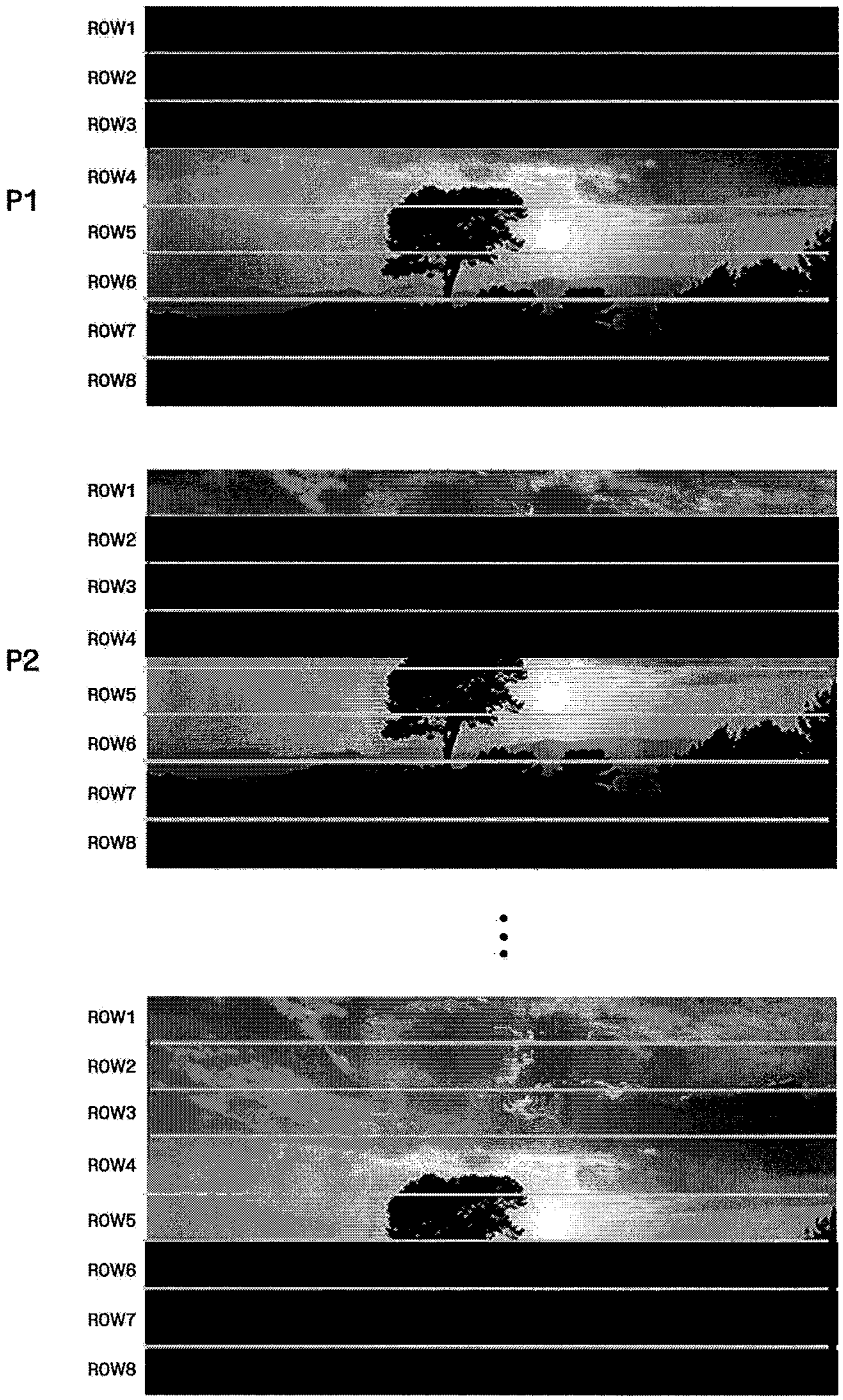
FIG. 10 is a conceptual view explaining the operation of lighting blocks according to an embodiment of the present invention.

At least one of the lighting blocks LB1 to LBn as described above may be successively turned on/off. FIG. 10 is a conceptual view explaining the operation of lighting blocks according an embodiment of the present invention. Referring to FIG. 10, three rows among eight rows ROW1 to ROW8 for one frame are grouped and successively turned on/off. That is, during a first period P1 of one frame, the lighting blocks of the first to third rows ROW1 to ROW3 are turned off and the lighting blocks of the fourth to eighth rows ROW4 to ROW8 are turned on to emit light having the above-described light luminance. During a second period P2, the lighting blocks of the second to fourth rows ROW2 to ROW4 are turned off, and the lighting blocks of the first row ROW1 and the fifth to eighth rows ROW5 to ROW8 are turned on to emit light having the above-described light luminance. As the operation of the lighting blocks as described above is successively performed, the lighting blocks of the sixth to eighth rows ROW6 to ROW8 are turned off, and the lighting blocks of the first to fifth rows ROW1 to ROW5 are turned on. As described above, at least one lighting block may be successively turned on/off.

The optical data signal control unit 600_2 may control the operation of the lighting blocks LB1 to LBn by using the optical data signals LDAT. Alternatively, the backlight drivers 800_1 to 800_*n* may control the operation of the lighting blocks LB1 to LBn by periodically turning on/off the LEDs. In the present invention, the method of controlling the operation of the lighting blocks LB1 to LBn is not limited to any one of the above-described methods according to one or more embodiments.

When an image is displayed on the LCD panel 300 in a state that the lighting blocks LB1 to LBn operate as shown in the embodiment of FIG. 10, an effect that a black image is inserted into at least one row ROW1 to ROW8 is produced for one frame. This means that the LCD panel operates in a manner similar to a CRT, and thus the display quality thereof is improved.

Figure 11:
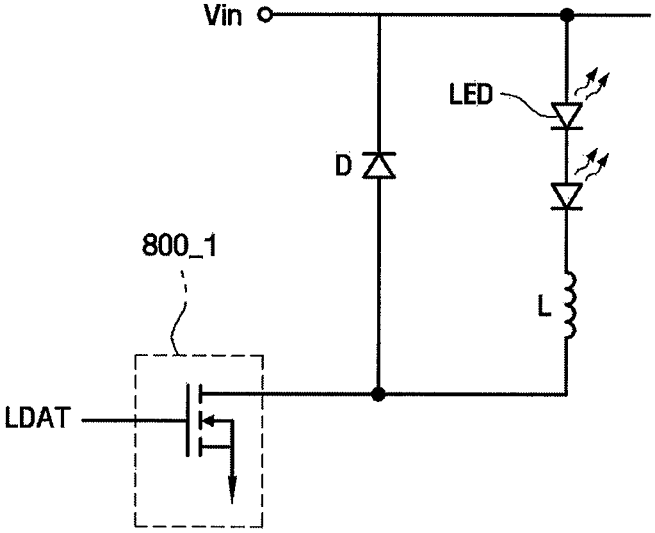
FIG. 11 is a circuit diagram explaining the operation of a backlight driver and a corresponding lighting block according to an embodiment of the present invention.

Hereinafter, with reference to FIG. 11, the operation of backlight drivers 800_1 to 800_*n* of FIG. 1 and corresponding lighting blocks LB1 to LBn will be described according to one or more embodiments. FIG. 11 is a circuit diagram explaining the operation of the first backlight driver 800_1 and the first lighting block LB1 connected thereto for convenience in explanation.

Referring to FIG. 11, the backlight driver 800_1 includes a switching element, and controls the luminance of the first lighting block LB1 in response to the optical data signal LDAT. Here, the optical data signal may be a PWM signal.

In operation, if the switching element of the backlight driver 800_1 is turned on in response to a high-level optical data signal LDAT inputted thereto, a power supply voltage Vin is provided to an LED, and current flows through the LED and an inductor L. At this time, energy caused by the current is stored in the inductor L. If the optical data signal LDAT goes to a low level, the switching element is turned off, and the LED, the inductor L, and a diode D form a closed circuit to cause current to flow in the closed circuit. At this time, as energy stored in the inductor L is discharged, the current is reduced. Since the turn-on time of the switching element is adjusted in accordance with a duty ratio of the optical data signal LDAT, the light luminance B_LB1 of the first lighting block LB1 is controlled in accordance with the duty ratio of the optical data signal LDAT. Also, in accordance with the optical data signal LDAT, at least one lighting block may be successively turned on/off.

However, according to an embodiment, the optical data signal control unit 600_2, unlike the optical data signal control unit as illustrated in the embodiment of FIG. 1, may output the optical data signal LDAT to the respective backlight drivers 800_1 to 800_*n* through a serial interface.

In the liquid crystal display and the method of driving the same according to an embodiment of the present invention, the LCD panel 300 may be divided into a plurality of display blocks DB1 to DB(n×m) in the form of a matrix, and the lighting blocks may be arranged to correspond to the rows of the matrix. The light luminance of the respective lighting blocks LB1 to LBn is adjusted corresponding to the rows ROW1 to ROW8 of the matrix, but the RGB image signals R, G, and B are corrected for the respective display blocks DB1 to DB(n×m). Accordingly, an effect may be obtained that is the same as or similar to that of a case in which the lighting blocks LB1 to LBn emit light having different light luminance B_LB1 to B_LBn corresponding to the display blocks DB1 to DB(n×m) in the form of a matrix. At this time, since a small number of light sources (e.g., LEDs) and backlight drivers 800_1 to 800_*n* may be used, the manufacturing cost of the liquid crystal display 10 may be reduced. However, the present invention is not limited thereto, and the lighting blocks LB1 to LBn may be arranged to correspond to the rows of the matrix according to one or more embodiments.

Figure 12:
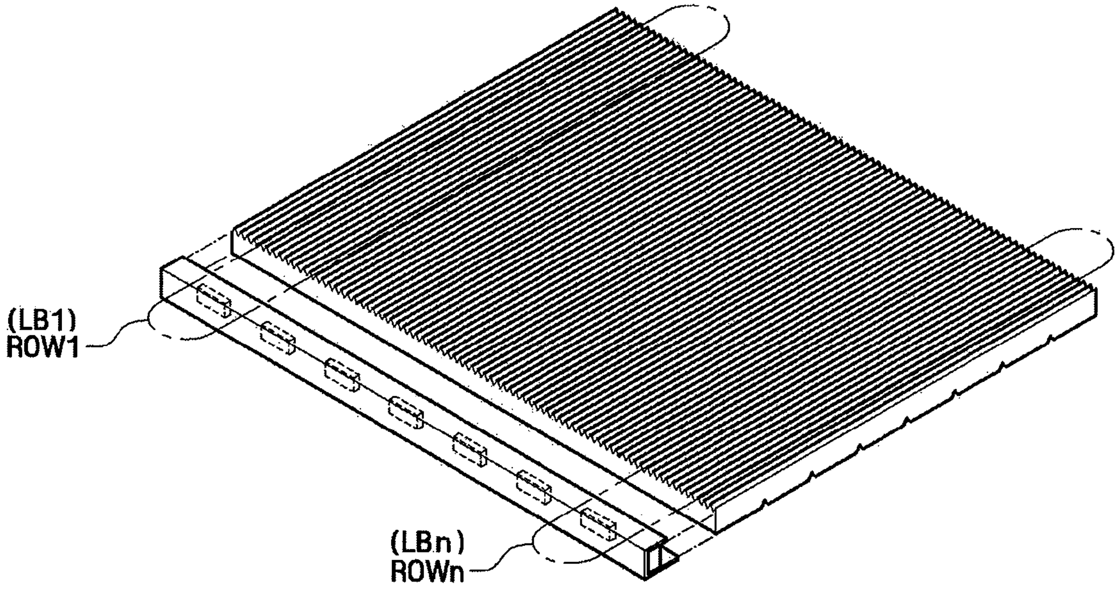
FIG. 12 is a perspective view of lighting blocks, explaining a modified example of the lighting blocks according to an embodiment of the present invention.
Figure 13A:
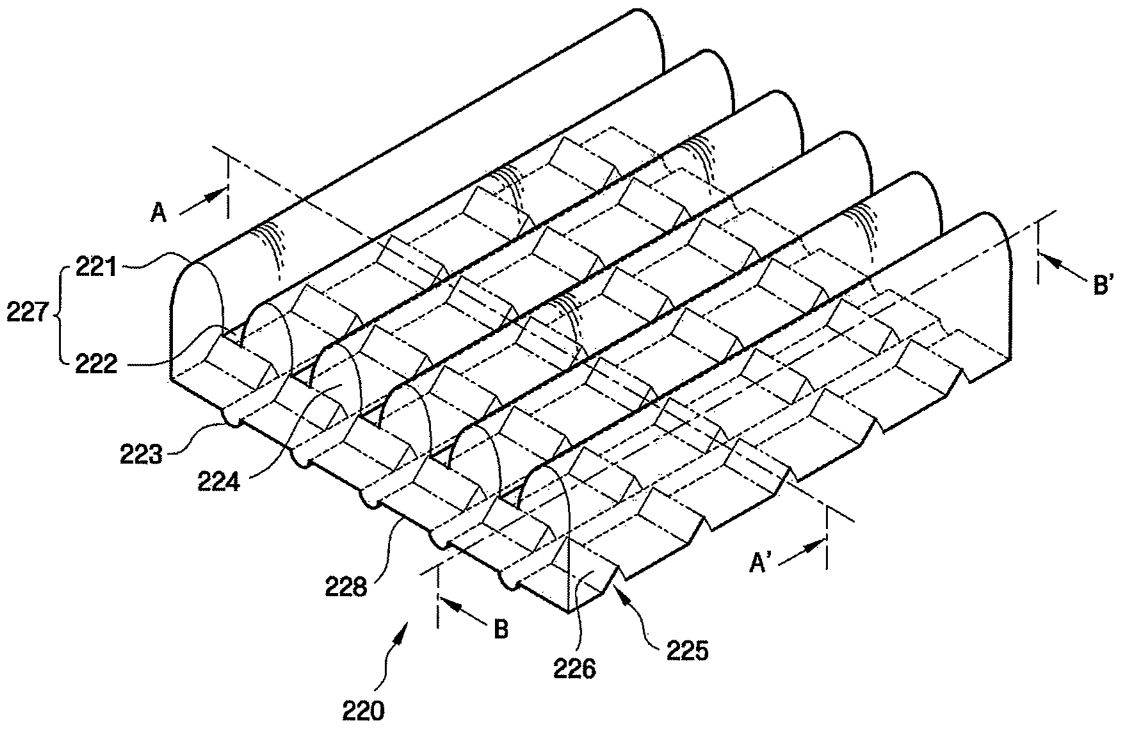
FIG. 13A is a perspective view explaining a light guide plate of FIG. 12 according to an embodiment of the present invention.
Figure 13B:
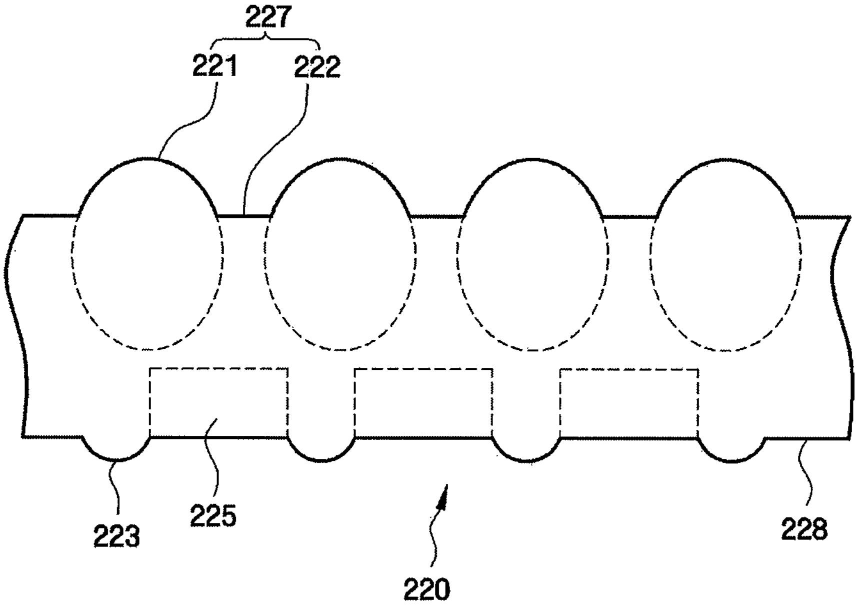
FIG. 13B is a sectional view taken along line AA' of FIG. 13A.
Figure 13C:
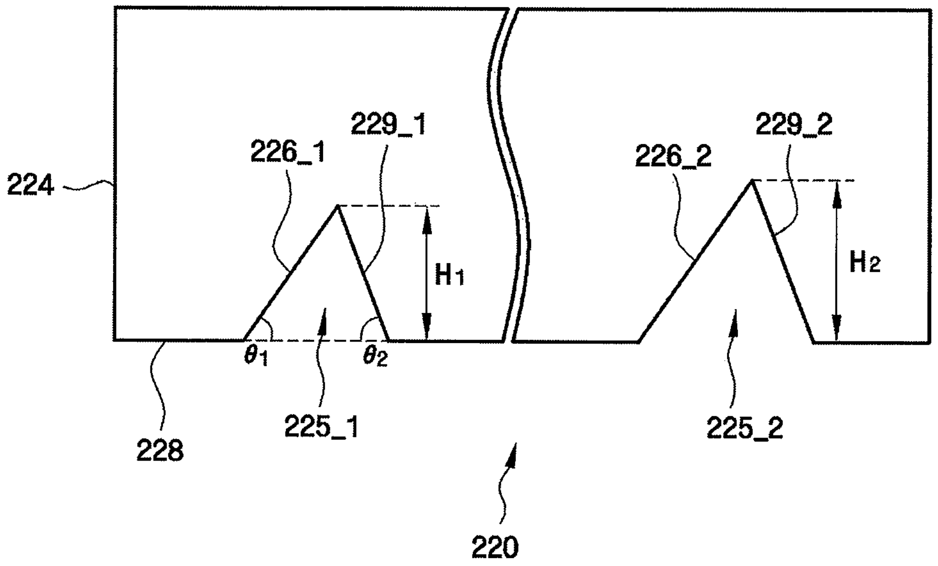
FIG. 13C is a sectional view taken along line BB' of FIG. 13A.
Figure 13D:
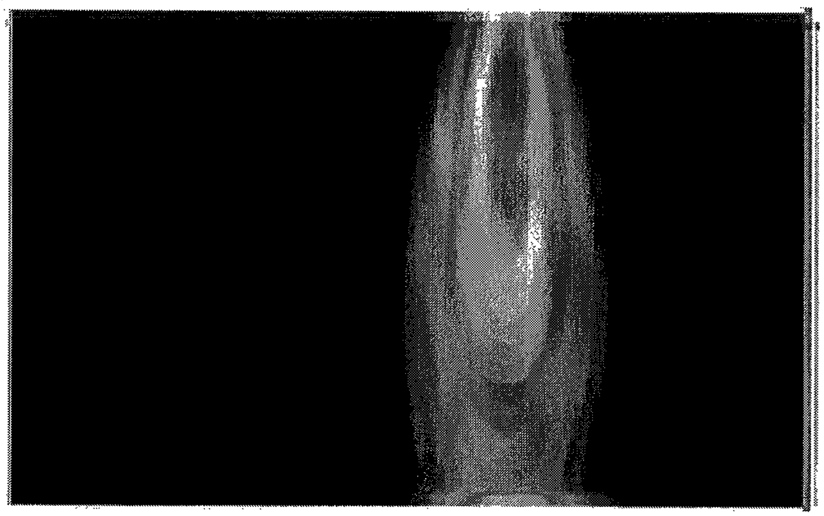
FIG. 13D is a beam profile of one lighting block according to an embodiment of the present invention.

Hereinafter, with reference to FIGS. 12 to 13D, a modified example of the lighting blocks will be described according to one or more embodiments. FIG. 12 is a perspective view of lighting blocks explaining a modified example of the lighting blocks. FIG. 13A is a perspective view explaining a light guide plate of FIG. 12, FIG. 13B is a sectional view taken along line AA' of FIG. 13A, FIG. 13C is a sectional view taken along line BB' of FIG. 13A, and FIG. 13D is a beam profile of one lighting block.

Unlike the lighting blocks as illustrated in the embodiment of FIG. 3, light sources may be provided only on one side of a lower part of the LCD panel 300. Hereinafter, it is exemplified that the light source is an LED, but the light source is not limited thereto.

The respective lighting blocks LB1 to LBn are of an edge type, and include LEDs arranged on one side surface of the lower part of the LCD panel to correspond to the respective rows ROW1 to ROWn. A light guide plate 220 (FIG. 13A) is provided on the lower part of the LCD panel 300 to guide the light emitted from the LEDs provided on one side surface toward an upper surface of the LCD panel 300.

Hereinafter, the structure of the light guide plate 200 according to an embodiment will be described in detail. However, the light guide plate is not limited to the structure as described below, but may be formed in various shapes.

In the light guide plate 220, a specified pattern may be formed on a light output surface 227 or an opposite surface 228 facing the light output surface 227 so that incident light may be uniformly transferred over the whole surface of the LCD panel 300.

Specifically, the light guide plate 220 includes a light input surface 224 and first protrusions 221 formed on the light output surface 227 adjacent to the light input surface 224. The first protrusions 221 may be formed to extend in a vertical direction. The first protrusions 221 may have elliptical cut portions parallel to the light input surface 224, and a spacer 222 having a flat surface may be formed between the first protrusions 221. Alternatively, the spacer 222 may have a concave or convex surface. One or more first protrusions 221 may be formed on the light output surface 227 of the light guide plate 220, and one or more second protrusions 223 may be formed on the opposite surface 228 facing the light output surface 227. The second protrusions 223 may extend in a direction parallel to the first protrusions 221. In addition, between the second protrusions 223, a reflective pattern 225 having a reflective surface 226 facing the light input surface 224 may be further formed. The reflective pattern 225, for example, may be in the form of a triangular prism having a negative angle, or it may be in diverse forms such as a semicircle, a pyramid, and the like. However, according to an embodiment, the second protrusions 223 may be omitted, and only the reflective pattern 225 may be formed on the opposite surface 228.

In order to heighten the reflection efficiency, the base angle θ1 (FIG. 13C) of the reflective surfaces 226_1 and 226_2 of the reflective pattern 225 located on the side of the light input surface 224 and the base angle θ2 of the opposite surfaces 229_1 and 229_2 may be formed to satisfy the conditions of $\theta1 \leq \theta2$. Also, since the luminance is lowered as the reflective pattern becomes more distant from the light input surface 224, the height H2 of the reflective pattern 225_2 formed apart from the light input surface 224 may be formed to be greater than the height H1 of the reflective pattern 225_1 formed near the light input surface 224 in order to heighten the luminance of a place more distant from the light input surface 224.

Via the light guide plate 220, the respective lighting blocks BL1 to BLn may be arranged to correspond to rows ROW1 to ROWn of the matrix. In FIG. 13D, a beam profile of one lighting block is illustrated according to an embodiment. The light emitted from one lighting block exerts almost no influence upon the adjacent lighting blocks. That is, the respective lighting blocks may be divided by using the light guide plate 220, without the necessity of physical division, and the light luminance for the respective lighting blocks LB1 to LBn may be adjusted.

For example, the lighting blocks LB1 to LBn as illustrated in FIG. 3 may be constructed by symmetrically arranging the light sources LEDs and the light guide plate 220 as illustrated in FIG. 12.

Figure 14:
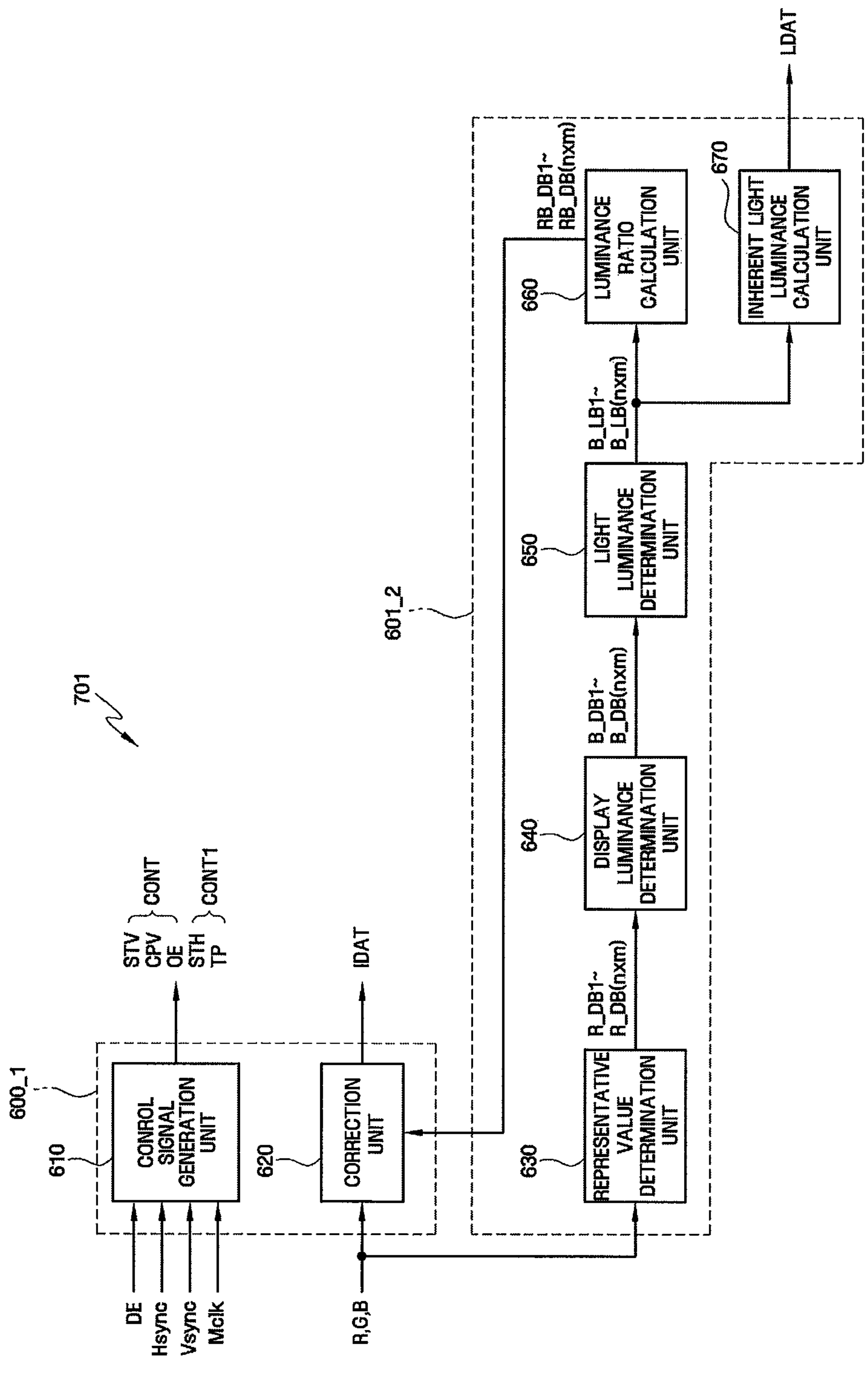
FIG. 14 is a block diagram illustrating the configuration of a signal control unit, explaining a liquid crystal display and a method of driving the same according to another embodiment of the present invention.
Figure 15A:
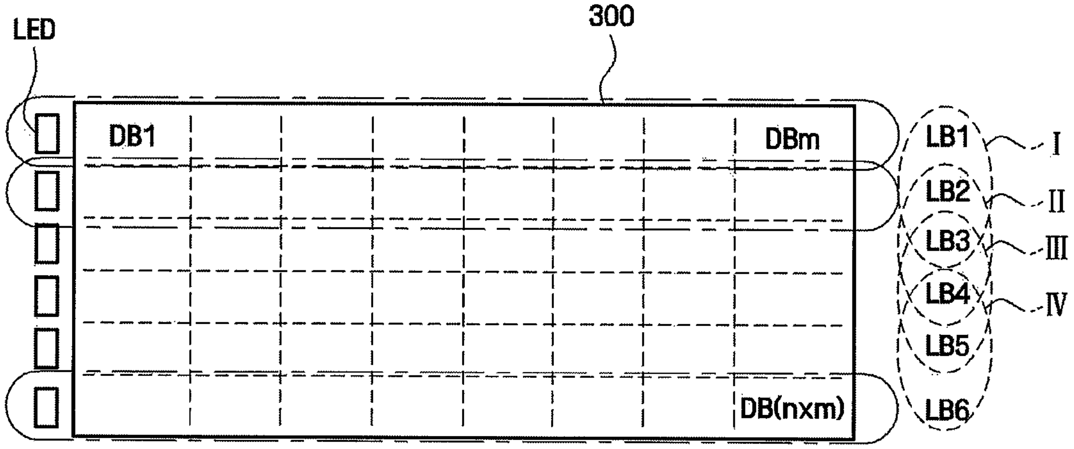
FIG. 15A is a conceptual view explaining the operation of an inherent light luminance calculation unit of FIG. 14 according to an embodiment of the present invention.

With reference to FIGS. 14 to 15B, a liquid crystal display and a method of driving the same according to another embodiment of the present invention will be described. FIG. 14 is a block diagram illustrating the configuration of a signal control unit, explaining a liquid crystal display and a method of driving the same according to another embodiment of the present invention. FIG. 15A is a conceptual view explaining the operation of an inherent light luminance calculation unit of FIG. 14, and FIG. 15B is a view showing equations explaining the operation of an inherent light luminance calculation unit of FIG. 14.

In the previous embodiment of the present invention described above, it is not considered that the respective lighting blocks LB1 to LBn may be influenced by the adjacent lighting blocks. For example, in the case where the respective lighting blocks LB1 to LBn are not physically separated from one another, the luminance of one lighting block LB1 to LBn may be influenced by the light emitted from other lighting blocks. Also, if the characteristic of the light guide plate 220 is not superior, the luminance of one lighting block LB1 to LBn may be influenced by the light emitted from other lighting blocks LB1 to LBn. That is, the light luminance B_LB1 to B_LBn of one lighting block LB1 to LBn may be formed through the superimposition of the light provided from other lighting blocks LB1 to LBn on the light provided from one lighting block LB1 to LBn. In this case, in order for the respective lighting blocks LB1 to LBn to finally have the light luminance B_LB1 to B_LBn, the light sources of the respective lighting blocks LB1 to LBn should emit light having an inherent light luminance that is lower than the light luminance B_LB1 to B_LBn. That is, it is required for the signal control unit 701 to output the optical data signals LDAT corresponding to the inherent light luminance that is lower than the light luminance B_LB1 to B_LBn to the backlight drivers 800_1 to 800_*n* (shown in FIG. 1).

To accomplish this, in the embodiment of the present invention, the signal control unit 701 may further include an inherent light luminance calculation unit 670. Specifically, the light luminance determination unit 650 determines the light luminance B_LB1 to B_LBn of the respective lighting blocks LB1 to LBn. The inherent light luminance calculation unit 670 calculates the inherent light luminance of the respective lighting blocks LB1 to LBn in consideration of the influence of other lighting blocks, and outputs the optical data signals LDAT corresponding to the inherent light luminance. Accordingly, the backlight drivers 800_1 to 800_*n* drive LEDs of the respective lighting blocks LB1 to LBn in response to the optical data signals LDAT, and the LEDs emit light having the inherent light luminance. Consequently, the respective lighting blocks LB1 to LBn may have the light luminance B_LB1 to B_LBn.

Hereinafter, the calculation of the inherent light luminance will be described in more detail with reference to FIGS. 15A and 15B. In this embodiment of the present invention, it is exemplified that 6 lighting blocks LB1 to LB6 are provided to correspond to 6 rows, and the luminance of one lighting block is influenced by other lighting blocks contacting the one lighting block.

In FIG. 15A, in the case of considering only group I, the luminance of the first lighting block LB1 is influenced by the luminance of the second lighting block LB2 that is in contact with the first lighting block, but it is not influenced by the luminance of the third lighting block LB3 that is not in contact with the first lighting block. Also, the luminance of the second lighting block LB2 is influenced by the luminance of the first and third lighting blocks LB1 and LB3. The luminance of the third lighting block LB3 is influenced by the luminance of the second lighting block LB2, but is not influenced by the first lighting block LB1.

Accordingly, as illustrated in FIG. 15B, three simultaneous equations of group I may be derived. Here, B1, B2, and B3 are light luminance values B_LB1 to B_LB3 of the respective lighting blocks LB1 to LB3, "Cij" is a coefficient indicating the degree of influence exerted on the i-th lighting block by the j-th lighting block, and "bi" is an inherent light luminance of the i-th lighting block. That is, the light luminance B_LB1 of the first lighting block LB1 is formed through the superimposition of the inherent light luminance of the first lighting block LB1 on the inherent light luminance of the second lighting block LB2. When LEDs of the first lighting block LB1 are operated so that the inherent light luminance of the first lighting block LB1 becomes "b1," the light luminance of the first lighting block LB1 is influenced by the inherent light luminance of the second lighting block LB2, and thus the first lighting block LB1 has the light luminance B_LB1 of B1. Here, "Cij" is a value that can be derived by experiments. In the same manner, for group II, group III, and group IV, simultaneous equations of the respective groups may be derived.

Accordingly, using the simultaneous equations of the respective groups, the inherent light luminance "b1" to "b6" of the respective lighting blocks LB1 to LB6 may be obtained. The inherent light luminance "b1," "b2," and "b3" are obtained in group I, "b2," "b3," and "b4" are obtained in group II, "b3," "b4," and "b5" are obtained in group III, and "b4," "b5," and "b6" are obtained in group IV. Duplicate solutions in the respective groups may be averaged. For example, "b2" may be obtained by averaging "b2" in group I and "b2" in group II, and "b3" may be obtained by averaging "b3" in group I, "b3" in group II, and "b3" in group III.

Through the above-described process according to an embodiment, the inherent light luminance calculation unit 670 may obtain the inherent light luminance "b1" to "b6" of the respective lighting blocks LB1 to LB6, and may output the optical data signals LDAT corresponding to the respective inherent light luminance "b1" to "b6."

Figures 16, 17:
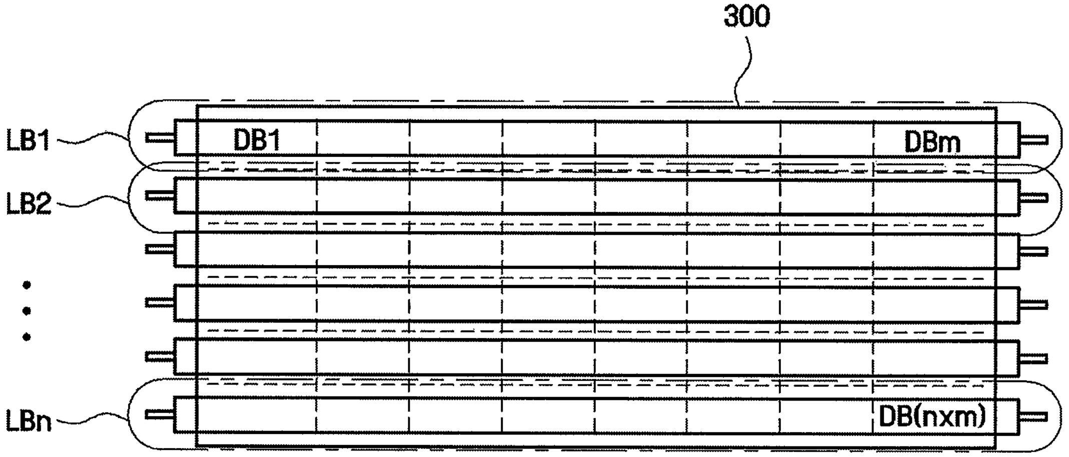
FIG. 16 is a view showing equations, explaining the operation of an inherent light luminance calculation unit of FIG. 14 according to an embodiment of the present invention.
FIG. 17 is a plan view of lighting blocks, explaining a liquid crystal display according to another embodiment of the present invention.

Hereinafter, with reference to FIGS. 14, 15A and 16, another method of calculating the inherent light luminance will be described according to an embodiment. FIG. 16 is a view showing equations, explaining another method of calculating the inherent light luminance through the signal control unit.

The above-described method is a method of calculating the inherent light luminance "b1" to "b6" of the respective lighting blocks LB1 to LB6 in the case where the luminance of one lighting block is influenced by other lighting blocks that are in contact with the one lighting block. In contrast, a method of calculating the inherent light luminance "b1" to "b6" of the respective lighting blocks LB1 to LBn in the case where the luminance of one lighting block is influenced by other lighting blocks that are not in contact with the one lighting block will now be described according to an embodiment.

In FIG. 15A, the first lighting block LB1 may be influenced by the inherent light luminance "b2" to "b6" of the second to sixth lighting blocks LB2 to LB6. Also, the second lighting block LB2 may be influenced by the inherent light luminance "b1," and "b3" to "b6" of the first and third to sixth lighting blocks LB1 and LB3 to LB6. The third lighting block LB3 is influenced by the luminance of the first, second, and fourth to sixth lighting blocks LB1, LB2, LB4 to LB6. In this manner, 6 simultaneous equations may be derived as shown in FIG. 16.

Here, B1, B2, B3, B4, B5, and B6 are the light luminance B_LB1 to B_LB6 of the respective lighting blocks LB1 to LB6, "Cij" is a coefficient indicating the degree of influence exerted on the i-th lighting block by the j-th lighting block, and "bi" is an inherent light luminance of the i-th lighting block. When LEDs of the i-th lighting block are operated so that only the luminance of the i-th lighting block becomes "bi," the i-th lighting block has the light luminance of B1. Here, "Cij" is a value that may be derived by experiments.

That is, the inherent light luminance calculation unit 670 may obtain the inherent light luminance "b1" to "b6" of the respective lighting blocks LB1 to LB6 through the equations as shown in FIG. 16. Also, the inherent light luminance calculation unit 670 outputs the optical data signals LDAT corresponding to the inherent light luminance "b1" to "b6."

With reference to FIG. 17, a liquid crystal display according to another embodiment of the present invention will be described. FIG. 17 is a plan view of lighting blocks, explaining a liquid crystal display according to another embodiment of the present invention.

Unlike the previous embodiment of the present invention, the lighting blocks LB1 to LBn according to another embodiment of the present invention are of a direct downward type and include line light sources. Here, the light source may be any one of a cold cathode fluorescent lamp (CCFL), a hot cathode fluorescent lamp (HCFL), or an external electrode fluorescent lamp (EEFL). The direct downward type lighting blocks LB1 to LBn including the line light sources, in the same manner as described above, may be arranged to correspond to the rows ROW1 to ROWn of the matrix, and may have different light luminance. Also, the respective direct downward type light sources may be successively turned on/off in the same manner as shown in FIG. 10.

In the liquid crystal display according to an embodiment of the present invention, the respective lighting blocks LB1 to LBn include line light sources, and the light luminance is adjusted corresponding to the rows ROW1 to ROWn of the matrix. However, since the RGB image signals R, G, and B are corrected for the respective display blocks D1 to DB(n×m), an effect may be obtained that is substantially the same as or similar to that of a case in which the lighting blocks LB1 to LBn emit light of different light luminance B_LB1 to B_LBn corresponding to the display blocks DB1 to DB(n×m) in the form of a matrix.

Figure 18:
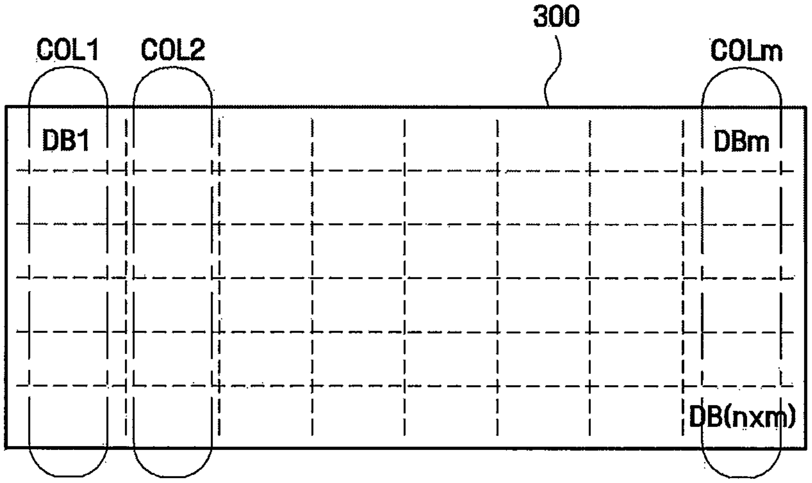
FIG. 18 is a conceptual view explaining a liquid crystal display and a method of driving the same according to another embodiment of the present invention.
Figure 19:
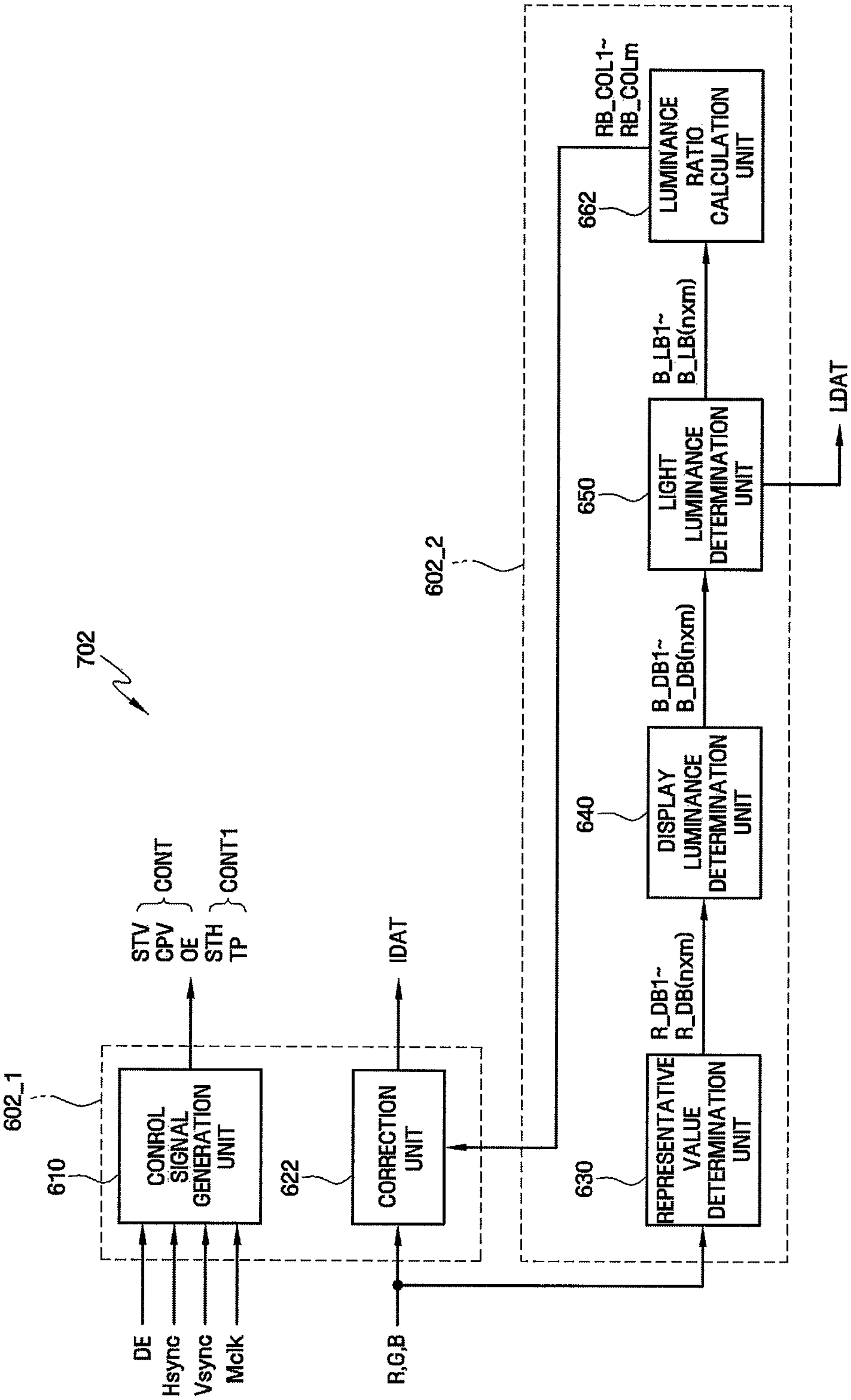
FIG. 19 is a block diagram illustrating the configuration of a signal control unit, explaining a liquid crystal display and a method of driving the same according to another embodiment of the present invention.

With reference to FIGS. 18 to 20, a liquid crystal display and a method of driving the same according to still another embodiment of the present invention will be described. FIG. 18 is a conceptual view explaining a liquid crystal display and a method of driving the same according to another embodiment of the present invention. FIG. 19 is a block diagram illustrating the configuration of a signal control unit, explaining a liquid crystal display and a method of driving the same according to another embodiment of the present invention, and FIG. 20 is a table explaining the operation of the signal control unit of FIG. 19.

In this embodiment, the LCD panel 300, as shown in FIG. 18, is divided into a plurality of display columns COL1 to COLm including some display blocks corresponding to at least one column of the matrix. The signal control unit 702 as shown in FIG. 19 determines display column luminance when the RGB image signals R, G, and B are provided to the respective display columns COL1 to COLm to display the image, determines column luminance ratios that are ratios of the display column luminance to the lighting blocks LB1 to LBn, and corrects the RGB image signals R, G, and B provided to the respective display columns COL1 to COLm in accordance with the column luminance ratios RB_COL1 to RB_COLm in the unit of the display columns COL1 to COLm.

Referring to FIGS. 19 and 20, the luminance ratio calculation unit 662 first calculates the block luminance ratios RB_DB1 to RB_D(n×m) as described above, and calculates the column luminance ratios RB_COL1 to RB_COLm by averaging the block luminance ratios RB_DB1 to RB_D(n×m) of some display blocks DB1 to DB(n×m) corresponding to the display columns COL1 to COLm. For example, the luminance ratio calculation unit 662 calculates the column luminance ratio RB_COL1 of 0.96 of the first display column COL1 by averaging the respective block luminance ratios RB_DB1 to RB_D(n×m) of 1.00, 1.00, 1.00, 1.00, 1.00, 0.93, 0.75, and 1.00 of the first column COL1. In this manner, the luminance ratio calculation unit 662 calculates the column luminance ratios RB_COL1 to RB_COLm of the respective display columns, and outputs the respective column luminance ratios RB_COL1 to RB_COLm to a correction unit 622.

The correction unit 622 corrects the gray level of the RGB image signals R, G, and B provided to the display columns COL1 to COLm in the unit of display columns COL1 to COLm by using the column luminance ratios RB_COL1 to RB_COLm. That is, the correction unit 622 corrects the gray level of the RGB image signals R, G, and B provided to the second display column COL2 by using the column luminance ratio RB_COL2 of 0.97. In the same manner, the correction unit corrects the gray level of the RGB image signals R, G, and B provided to the third to tenth display columns COL3 to COL10 by using the column luminance ratios of 0.95, 0.84, 0.77, 0.85, 0.96, 0.82, 0.80, and 0.79.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A display device comprising:

a display panel including a plurality of display blocks arranged in the form of a matrix;

a plurality of lighting blocks configured to emit light toward the display panel, each of the lighting blocks being arranged so as to correspond to at least one row of the matrix and being adjustable; and a signal control unit adapted to receive an image signal, determine display block luminances associated with the display blocks using values related to the image signal, determine light luminances of the lighting blocks using the display block luminances, use the image signal and values that are calculated using both the light luminances and the display block luminances to form a corrected image signal, and provide the corrected image signal to the display panel, wherein the signal control unit is configured to calculate block luminance ratios of the display block luminances to the light luminances and is configured to correct gray levels of the image signal provided to the respective display blocks.

2. The display device of claim 1, wherein the signal control unit comprises:

a representative value determination unit configured to receive the image signal and to determine representative values of the respective display blocks;

a block luminance determination unit configured to determine the display block luminances of the respective display blocks in accordance with the representative values;

a light luminance determination unit configured to determine the light luminances of the respective light blocks by using the display block luminances;

a luminance ratio calculation unit configured to calculate the block luminance ratios of the display block luminances to the light luminances; and a correction unit configured to correct the gray levels of the image signal provided to the respective display blocks in accordance with the block luminance ratios.

3. The display device of claim 2, wherein the representative value determination unit determines average values of the image signal provided to the respective display blocks as the representative values.

4. The display device of claim 2, wherein the light luminance determination unit is configured to determine a maximum value of the display block luminances of some display blocks corresponding to the lighting blocks.

5. The display device of claim 1, wherein the display panel is divided into a plurality of display columns including some display blocks corresponding to at least one column of the matrix; and wherein the signal control unit corrects the image signal for each display column by using the light luminances and the display block luminances.

6. The display device of claim 5, wherein the signal control unit is configured to calculate the block luminance ratios of the display block luminances to the light luminances, to calculate column luminance ratios of the display columns by using the block luminance ratios, and to correct the gray levels of the image signal provided to the respective display columns in accordance with the column luminance ratios.

7. The display device of claim 6, wherein the signal control unit comprises:

a representative value determination unit for receiving the image signal and determining representative values of the respective display blocks;

a block luminance determination unit configured to determine the display block luminances of the respective display blocks in accordance with the representative values;

a light luminance determination unit configured to determine the light luminances of the respective light blocks by using the display block luminance;

a luminance ratio calculation unit configured to calculate the block luminance ratios to the light luminances, and to calculate the column luminance ratios by averaging the block luminance ratios of some display blocks corresponding to the display columns; and a correction unit configured to correct the gray levels of the image signal provided to the respective display columns in accordance with the column luminance ratios.

8. The display device of claim 1, wherein the light luminances of the respective lighting blocks are formed through superimposition of inherent light luminance of other adjacent lighting blocks onto the inherent light luminance of respective lighting blocks, wherein the respective lighting blocks have inherent light luminance.

9. The display device of claim 8, wherein the lighting block comprises a light source configured to receive an optical data signal and to emit light of the inherent light luminance; and wherein the signal control unit is configured to calculate the inherent light luminance of the respective lighting blocks by using the light luminance, and is configured to output the optical data signal corresponding to the inherent light luminance.

10. The display device of claim 1, wherein the lighting blocks each comprise a direct downward type optical source.

11. The display device of claim 1, wherein the lighting blocks each comprise an edge type optical source provided on at least one of one side and an opposite side of a lower part of the display panel.

12. The display device of claim 1, wherein at least one lighting block is to be successively turned on/off.

13. The display device of claim 1, wherein the signal control unit is configured to determine a gray level for a display block of the display blocks using a relation between a light luminance associated with the display block and a display block luminance associated with the display block.

14. A display device comprising:

a display panel including a plurality of display blocks arranged in the form of a matrix;

a plurality of lighting blocks including light sources provided on at least one of one side and an opposite side of a lower part of the display panel, each of the lighting blocks being arranged so as to correspond to at least one row of the matrix and being adjustable; and a signal control unit adapted to receive an image signal, determine display block luminances associated with the display blocks using values related to the image signal, determine light luminances of the lighting blocks using the display block luminances, determine a gray level for at least a display block of the display blocks using a value that is calculated using both a light luminance associated with the display block and a display block luminance associated with the display block so as to form a corrected image signal, and provide the corrected image signal to the display panel, wherein the signal control unit is configured to calculate block luminance ratios of the display block luminances to the light luminances and is configured to correct gray levels of the image signal provided to the respective display blocks.

15. The display device of claim 14, wherein the light luminances of the respective lighting blocks are formed through superimposition of inherent light luminance of other adjacent lighting blocks onto the inherent light luminance of respective lighting blocks, wherein the respective lighting blocks have inherent light luminance.

16. The display device of claim 14, wherein the signal control unit is configured to calculate the inherent light luminance of the respective lighting blocks by using the light luminance, and is configured to output the optical data signal corresponding to the inherent light luminance; and wherein the optical source is configured to receive an optical data signal and to emit light of the inherent light luminance.

17. The display device of claim 14, wherein at least one lighting block is to be successively turned on/off.

18. A method of driving a display device including a display panel having a plurality of display blocks arranged in the form of a matrix, and a plurality of lighting blocks each being arranged so as to correspond to at least one row of the matrix and being configured for emitting light toward the display panel, the method comprising:

receiving an image signal;

determining display block luminances associated with the display blocks using values related to the image signal;

determining light luminances of the lighting blocks using the display block luminances;

generating a corrected image signal by at least determining a gray level for a display block of the display blocks using a value that is calculated using both a light luminance associated with the display block and a display block luminance associated with the display block;

calculating display block luminance ratios of the display block luminances to the light luminances;

correcting gray levels of the image signal provided to the respective display blocks in accordance with the display block luminance ratios;

emitting light in accordance with the light luminances; and displaying an image in accordance with the corrected image signal.

19. The method of claim 18, wherein the determining comprises determining representative values of the respective display blocks.

20. The method of claim 18, wherein when the display panel is divided into a plurality of display columns including some display blocks corresponding to at least one column of the matrix, and wherein the correcting comprises:

calculating block luminance ratios of the display block luminances to the light luminances;

calculating column luminance ratios of the display columns by using the block luminance ratios; and correcting gray levels of the image signal provided to the display columns in accordance with the column luminance ratios.

21. The method of claim 20, wherein the calculating column luminance ratios comprises averaging the block luminance ratios of some display blocks corresponding to the display columns.

* * * * *